(12) United States Patent
Schütz

(10) Patent No.: US 6,450,549 B1
(45) Date of Patent: Sep. 17, 2002

(54) PRESS-FITTING CONNECTOR FOR PLASTIC COMPOSITE PIPERS

(75) Inventor: Udo Schütz, Selters (DE)

(73) Assignee: Schütz-Werke GmbH & Co. KG, Selters (DE)

( * ) Notice: Subject to any disclaimer, the term of this patent is extended or adjusted under 35 U.S.C. 154(b) by 0 days.

(21) Appl. No.: 09/850,722

(22) Filed: May 7, 2001

(30) Foreign Application Priority Data

May 10, 2000 (DE) .......................... 100 22 893

(51) Int. Cl.[7] ............................................... F16L 33/00
(52) U.S. Cl. ......................................... 285/256; 285/331
(58) Field of Search ................................ 285/256, 382, 285/381, 331; 29/520

(56) References Cited

U.S. PATENT DOCUMENTS 3,578,360 A * 5/1971 Eliot ........................... 285/256
4,114,250 A * 9/1978 Dent ....................... 285/382 X
4,544,187 A * 10/1985 Smith .......................... 285/256
6,086,115 A * 7/2000 Sahu ....................... 285/256 X

FOREIGN PATENT DOCUMENTS

DE 4441373 12/1997
EP 0611911 8/1994

* cited by examiner

Primary Examiner—Lynne H. Browne
Assistant Examiner—David E. Brochna
(74) Attorney, Agent, or Firm—Friedrich Kueffner

(57) ABSTRACT

A press-fitting connector for plastic composite pipes, comprised of an inner plastic layer, an outer plastic layer, and a middle metal layer, has a support member receiving the end of a plastic composite pipe. The support member has an outer collar having a first end face facing the plastic composite pipe and a second end face facing away from the plastic composite pipe. An insulating plastic ring is positioned at the first end face. A press-fit sleeve secures the pipe end on the support member. The outer collar has two diametrically opposed cutouts. The insulating plastic ring is a curved spring washer with two convexly curved and two concavely curved portions, wherein the convexly curved portions have monolithic, axis-parallel tongues engaging the cutouts of the circumferential rib. The axis-parallel tongues in the end position of the plastic composite pipe project partially from the cutouts past the second end face of the outer collar.

5 Claims, 3 Drawing Sheets

Fig. 5
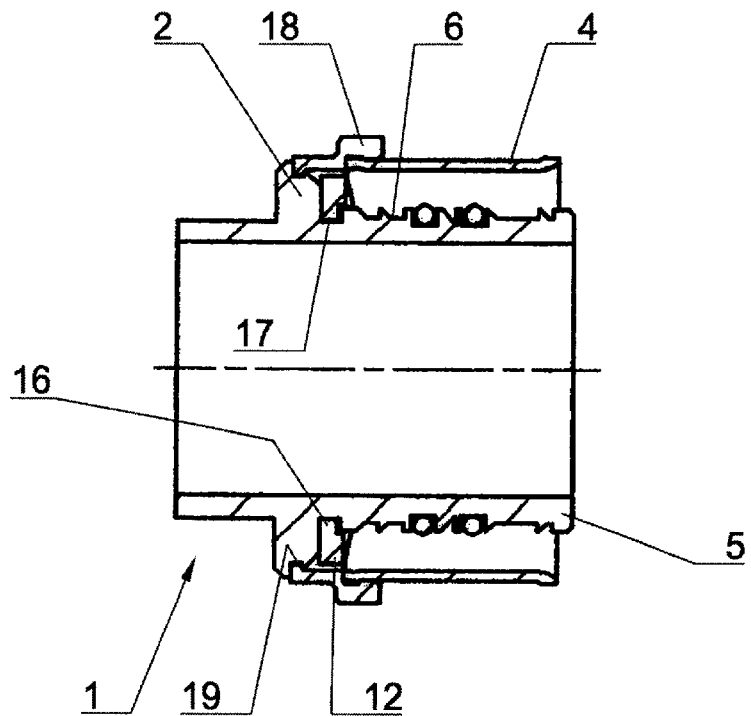
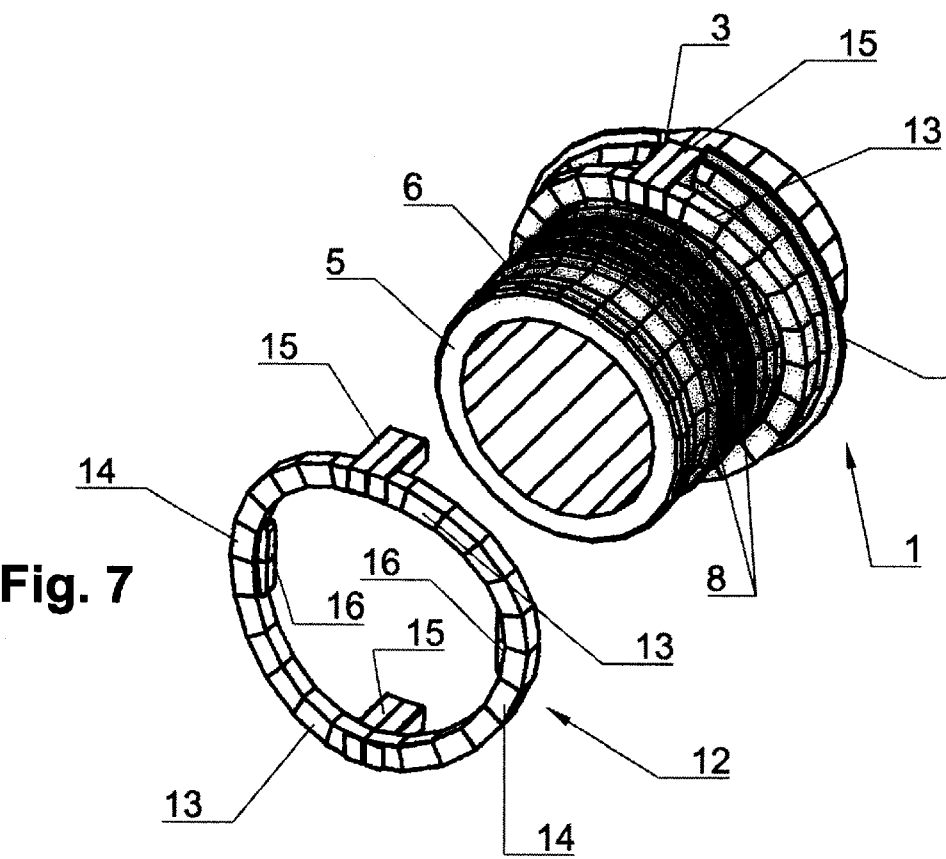
Fig. 6
Fig. 7

PRESS-FITTING CONNECTOR FOR PLASTIC COMPOSITE PIPERS

BACKGROUND OF THE INVENTION

1. Field of the Invention

The invention relates to a press-fitting connector for plastic composite pipes which are comprised of an inner layer and an outer layer of plastic material and a middle layer of metal, preferably aluminum, wherein the press-fitting connector comprises a support member onto which the end of the composite pipe can be slipped against an insulating ring of plastic material and an outer collar of the press-fitting connector, wherein the end of the composite pipe can be secured by means of a press-fit sleeve.

2. Description of the Related Art

It is known from DE 44 41 373 C2 to use press-fitting connectors of this kind for connecting plastic composite pipes to other fixtures or fittings. The outer collar of these known press-fitting connectors is L-shaped in axial section, wherein the free leg of the outer collar extending axis-parallel has a cutout at several locations which extends radially and provides a visual control of the plastic composite pipe slipped onto the support member up to the stop (collar). In order to protect these radial cutouts against soiling, this area should be protected by means of a corresponding transparent plastic ring. The transparency of such a ring, which, however, is not mentioned in the cited prior art DE 44 41 373 C2, is necessary because of the desired visual control of the insertion position of the composite pipe. However, the visual control made possible by means of this ring is greatly impaired, in particular, at mounting locations that are difficult to access.

A further disadvantage of this known press-fitting connector is that the aluminum layer of the plastic-metal composite pipe can come into contact with a press-fitting connector which, in general, is made of brass, and such a contact should be prevented in order to protect against corrosion. This disadvantage is prevented in a sealing connection of plastic-metal-plastic composite pipes according to EP 0 611 911 A1 by an annular plastic part which is snapped into place on the end of the press-fit sleeve and which is configured such that its inner flange end covers the end face of the composite pipe and thus prevents contact of the exposed metal layer at the end face of the composite pipe with the brass fitting. In this embodiment, however, the visual control of the correct position of the composite pipe at the stop of the press-fitting connector is not possible.

SUMMARY OF THE INVENTION

It is an object of the present invention to develop a press-fitting connector for plastic composite pipes which provides visual control of the correct position of the composite pipe between the press-fitting connector and the press-fit sleeve as well as an insulation between the end face of the composite pipe and the fitting.

In accordance with the present invention, this is achieved in that an outer circumferential rib of the press-fitting connector has two diametrically opposed cutouts and that the insulation ring of plastic material is embodied like a curved spring washer curved in the direction toward the composite pipe twice convexly and twice concavely, wherein in the center of each convexly curved portion of the insulating ring an axis-parallel tongue is formed as a monolithic part which engages one of the cutouts of the outer circumferential rib of the press-fitting connector and projects partially from the corresponding cutout in the axis-parallel direction at the side of the outer circumferential rib facing away from the composite pipe, when the composite pipe is completely inserted up to the stop position between the support member and the press-fit sleeve.

The embodiment according to the invention of a press-fitting connector provides in any position an excellent visual control and optionally also a control by touch of the correct position of the composite pipe between the press-fitting connector and the press-fit sleeve when the springy insulating ring made of plastic material, which is curved like a curved spring washer, is flattened by the inserted composite pipe so that the tongues project in the axial direction from the cutouts of the outer circumferential rib of the press-fitting connector in a visible and touchable way. In this connection, it can also be easily detected if the composite pipe slips relative to the press-fitting connector during further processing of the pipe connection, for example, when starting the pressing process. Moreover, the insulating ring prevents the!direct contact of the end face of the composite pipe with the press-fitting connector.

BRIEF DESCRIPTION OF THE DRAWING

In the drawing:

FIG. 5 shows a longitudinal section according to FIG. 4 rotated by 90°;

FIG. 6 is a perspective illustration of the fitting without press-fit sleeve and composite pipe; and FIG. 7 shows the insulating ring of the press-fitting connector in a perspective illustration.

DESCRIPTION OF THE PREFERRED EMBODIMENTS

Figure 1:
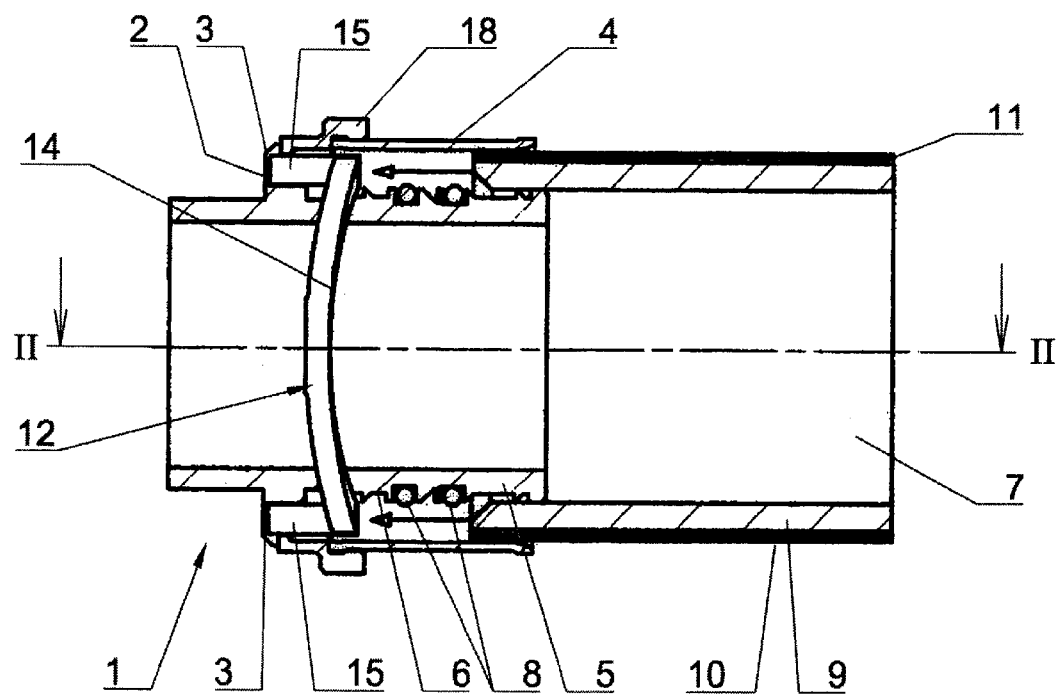
FIG. 1 shows a longitudinal section of the press-fitting connector with the composite pipe not yet completely inserted.
Figure 2:
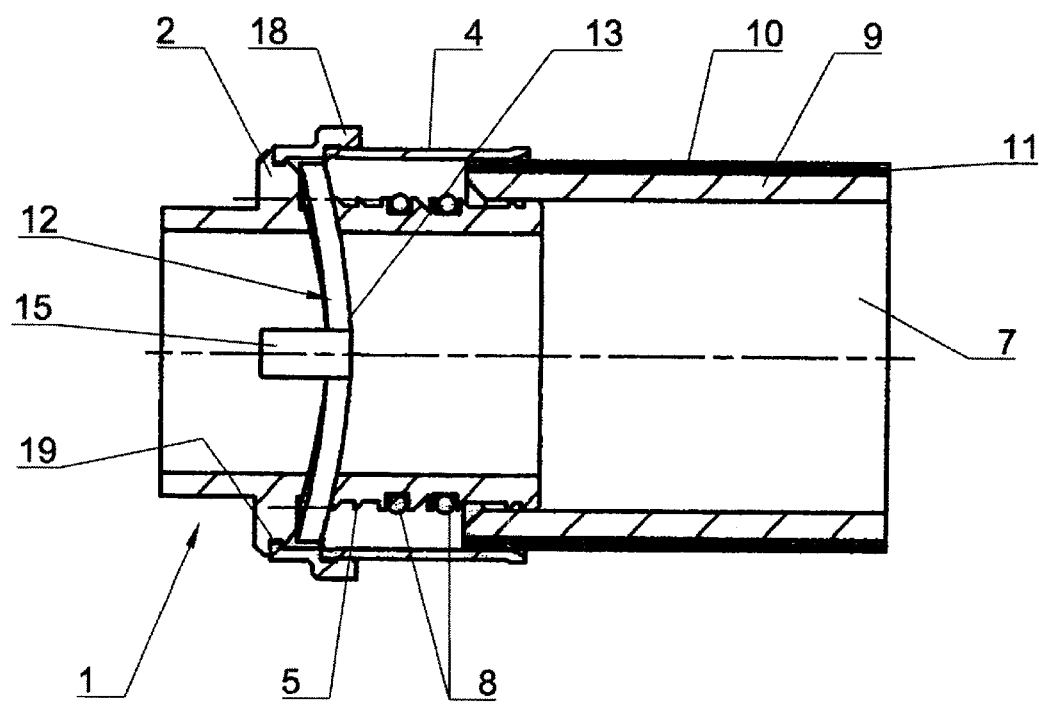
FIG. 2 is a section along the line II—II of FIG. 1.

The brass press-fitting connector 1 according to FIGS. 1 and 6 has an outer circumferential rib 2 with cutouts 3. The press-fitting connector 1 includes moreover a press-fit sleeve 4 of metal, for example, aluminum, which is illustrated in the not yet pressed state in the individual illustrations of the drawing.

The support member 5 of the press-fitting connector 1 has, as is conventional, circumferential grooves 6 into which a plastic composite pipe 7 is pressed in a positive-locking way during pressing of the press-fit sleeve 4. Sealing rings 8 can be inserted into some of the circumferential grooves 6. In FIG. 1, the composite pipe 7 which has an inner plastic layer 9 and an outer plastic layer 10 as well as an intermediate layer 11 of metal, for example, aluminum, is not yet slipped completely onto the support member 5 of the press-fitting connector 1.

Between the support member 5 and the press-fit sleeve 4 of the press-fitting connector 1, an insulating ring 12 is provided which is made of plastic and curved in the way of a multi-curved spring washer such that it has two convexly curved portions 13 facing in the direction toward the composite pipe 7 and two concavely curved portions 14 facing in the direction toward the composite pipe 7. At the center of the convexly curved portions 13 axis-parallel tongues 15 are formed as monolithic parts. At the center of the concavely curved portions 14 radially inwardly extending monolithic projections 16 are provided on the insulating ring 12 which engage a separate outer circumferential groove 17 of the support member 5 and which secure captively the insulating ring 12 before mounting of the pipe connection. The area of the insulating ring 12 and an end area of the press-fit sleeve 4 are covered by a plastic ring 18 which is snapped into place in an outer peripheral groove 19 of the outer circumferential rib 2 of the press-fitting connector 1.

Figure 3:
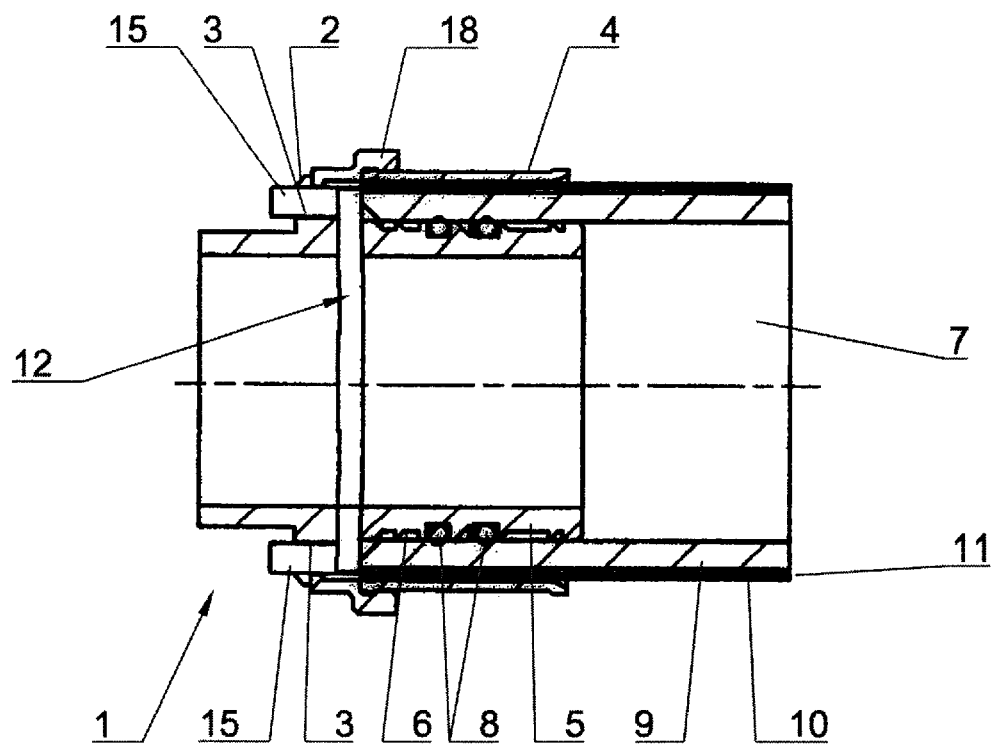
FIG. 3 shows a longitudinal section according to FIG. 1 with completely inserted but not;yet pressed composite pipe.
Figure 4:
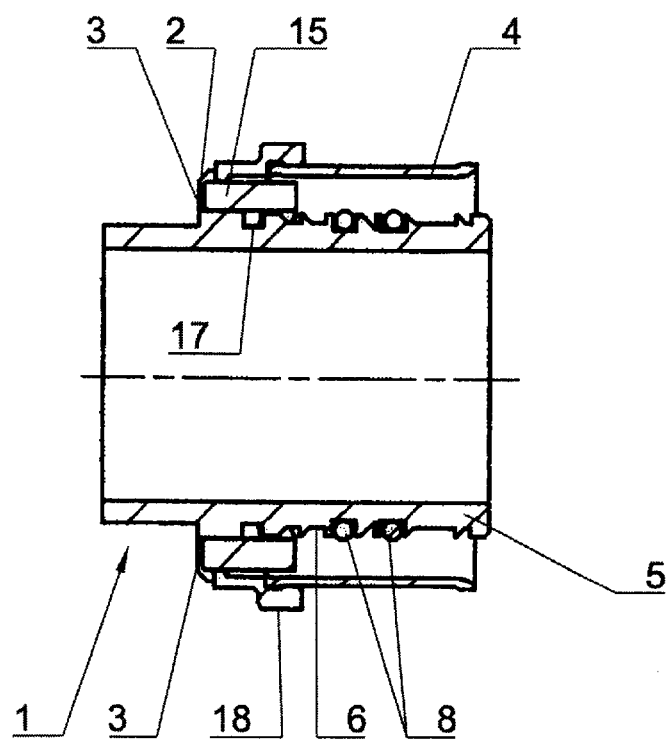
FIG. 4 is a longitudinal section of the press-fitting connector without composite pipe.

As illustrated in FIG. 3, the insulating ring 12 which, as mentioned above, prevents the direct contact of the end face of the composite pipe 7 with the press-fitting connector 1 comprised of brass, is flattened by the completely inserted composite pipe 7 so that the tongues 15 project through the cutouts 3 of the outer circumferential rib 2 to the exterior which indicates that the composite pipe 7 has been inserted correctly for the subsequent pressing step. Should upon further treatment of the pipe connection, for example, when starting the pressing process, the composite pipe 7 slip slightly, this can be seen easily by means of the tongues 15 and can therefore be corrected easily. A visual access, as disclosed in the prior art, is thus not required and is often not even possible. In some cases it is also possible for the user to feel with his fingers (control by touch) whether the tongues 15 project with the preset amount from the cutouts 3 of the outer circumferential ribs 2 indicating that the composite pipe 7 is seated in the correct position.

While specific embodiments of the invention have been shown and described in detail to illustrate the inventive principles, it will be understood that the invention may be embodied otherwise without departing from such principles.

What is claimed is:

1. A press-fitting connector for plastic composite pipes, the plastic composite pipes comprised of an inner plastic layer and an outer plastic layer and a middle layer comprised of metal and arranged between the inner and outer layers, the press-fitting connector comprising:

a support member configured to receive an end of a plastic composite pipe by slipping the end of the plastic composite pipe onto the support member;

the support member having an outer collar having a first end face facing the plastic composite pipe and a second end face facing away from the plastic composite pipe;

an insulating plastic ring positioned at the first end face of the outer collar;

a press-fit sleeve configured to secure the end of the plastic composite pipe on the support member;

wherein the outer collar is a circumferential rib and has two diametrically opposed arranged cutouts;

wherein the insulating plastic ring is a curved spring washer which has two convexly curved portions and two concavely curved portions, facing the plastic composite pipe, respectively, wherein at a center of each one of the convexly curved portions a tongue is formed as a monolithic part of the spring washer, wherein the tongue extends in an axis-parallel direction relative to an axis of the spring washer, respectively, wherein the tongue is configured to engage one of the cutouts of the circumferential rib, respectively;

wherein the axis-parallel tongues in an end position of the plastic composite pipe, when completely inserted between the support member and the press-fit sleeve and stopped by the insulating plastic ring and the circumferential rib, project partially from the cutouts in the circumferential rib past the second end face of the outer collar in the axis-parallel direction.

2. The press-fitting connector according to claim 1, wherein the support member has an outer circumferential groove, wherein the concavely curved portions of the insulating plastic ring have a radially inwardly extending projection, respectively, and wherein the radially inwardly extending projections secure captively the insulating plastic ring in the outer circumferential groove prior to mounting of the plastic composite pipe.

3. The press-fitting connector according to claim 2, wherein the radially inwardly extending projections are rotated 90° relative to the tongues.

4. The press-fitting connector according to claim 1, further comprising an annular plastic member, wherein the outer collar has an outer peripheral groove and wherein the annular plastic member is snapped into place in the outer peripheral groove and is configured to cover an end of the press-fit sleeve and the insulating ring.

5. The press-fitting connector according to claim 1, wherein the metal of the middle layer is aluminum.

\* \* \* \* \*